US011706361B2

(12) United States Patent
    Wada

(10) Patent No.: US 11,706,361 B2
(45) Date of Patent: Jul. 18, 2023

(54) IMAGE FORMING APPARATUS

(71) Applicant: BROTHER KOGYO KABUSHIKI KAISHA, Nagoya (JP)

(72) Inventor: Tomohiro Wada, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 17/514,871

(22) Filed: Oct. 29, 2021

(65) Prior Publication Data

US 2022/0210283 A1     Jun. 30, 2022

Related U.S. Application Data

(63) Continuation of application No. 17/083,060, filed on Oct. 28, 2020, now Pat. No. 11,165,921.

(30) Foreign Application Priority Data

Oct. 31, 2019    (JP) ................................. 2019-198964

(51) Int. Cl.
    *H04N 1/00*          (2006.01)

(52) U.S. Cl.
    CPC ..... *H04N 1/00602* (2013.01); *H04N 1/00204* (2013.01)

(58) Field of Classification Search
    CPC ........... H04N 1/00204; H04N 1/00602; H04N 1/00206; H04N 1/00241; H04N 1/00307;
(Continued)

(56) References Cited

U.S. PATENT DOCUMENTS 7,387,382 B2 *   6/2008   Kagami ................... B41J 29/13
                                        347/108
8,867,932 B2 * 10/2014   Ukai ................... G03G 15/0867
                                        399/119
(Continued)

FOREIGN PATENT DOCUMENTS

JP        2002-086854 A     3/2002
JP        2008-147982 A     6/2008
(Continued)

OTHER PUBLICATIONS

Japan Patent Office, Notice of Reasons for Refusal issued in Japanese Patent Application No. 2019-198964, dated May 19, 2023, dispatched May 30, 2023.

*Primary Examiner* — Negussie Worku
(74) *Attorney, Agent, or Firm* — Baker Botts L.L.P.

(57) ABSTRACT

An image forming apparatus includes a housing, an discharge tray, a discharging roller pair, a main board, a wireless communication unit including a first wireless communication board. The housing includes a first part and a second part. The first part is arranged at a downstream side of a nip of the discharging roller pair, and an upper surface of a side wall of the first part is arranged at a lower position with respect to the nip. In the second part, the discharging roller pair is positioned. The second part is arranged at an upstream side of the first part. An upper surface of a side wall of the second part is arranged at a higher poison with respect to first part. At least part of the wireless communication unit is arranged at a higher poison with respect to the side wall of the first part.

11 Claims, 9 Drawing Sheets

(58) Field of Classification Search
CPC ........... H04N 1/00315; H04N 1/00342; H04N 1/00564; H04N 2201/0094; B65H 2511/51; B65H 2511/515; B65H 2513/10; B65H 2513/50; B65H 3/06; B65H 5/062; B65H 7/02; B65H 7/14; B65H 9/002; B65H 2220/01; B65H 2220/02; G03G 15/5029; G03G 15/6511; G03G 15/6564; G03G 15/70
USPC ........................................................ 358/1.15
See application file for complete search history.

(56) References Cited

U.S. PATENT DOCUMENTS

| | | | |
|---|---|---|---|
| 9,459,583 B2 | 10/2016 | Wada | |
| 9,481,190 B2 | 11/2016 | Ito et al. | |
| 9,544,455 B2 | 1/2017 | Ueyama | |
| 9,635,201 B2* | 4/2017 | Miwa | H04N 1/00 |
| 11,029,634 B2* | 6/2021 | Mori | G03G 21/1604 |
| 11,165,921 B2* | 11/2021 | Wada | H04N 1/00602 |
| 11,221,580 B2* | 1/2022 | Okamoto | G03G 15/5066 |
| 2008/0264801 A1 | 10/2008 | West et al. | |
| 2013/0229683 A1 | 9/2013 | Nakayama | |
| 2013/0286433 A1 | 10/2013 | Matsushima et al. | |
| 2014/0132652 A1 | 5/2014 | Nakamura | |
| 2015/0146251 A1 | 5/2015 | Ueyama | |
| 2015/0160607 A1* | 6/2015 | Takagi | G03G 21/1853 |
| | | | 399/111 |
| 2015/0280306 A1* | 10/2015 | Asai | H01Q 1/06 |
| | | | 343/866 |
| 2015/0346672 A1 | 12/2015 | Nakamura | |
| 2017/0034373 A1 | 2/2017 | Shigeno | |
| 2017/0075265 A1* | 3/2017 | Chiba | G03G 15/2039 |
| 2018/0207965 A1 | 7/2018 | Suzuki et al. | |
| 2020/0012775 A1 | 1/2020 | Yoshino et al. | |
| 2020/0310329 A1 | 10/2020 | Shuhama et al. | |
| 2020/0324991 A1* | 10/2020 | Nakamura | G03G 15/5029 |
| 2020/0344871 A1 | 10/2020 | Momose | |
| 2021/0136242 A1* | 5/2021 | Wada | H04N 1/00408 |
| 2021/0136243 A1* | 5/2021 | Wada | H04N 1/00602 |
| 2021/0294258 A1* | 9/2021 | Suzuki | B65H 5/062 |
| 2022/0182501 A1* | 6/2022 | Jo | H04N 1/00342 |
| 2022/0214644 A1 | 7/2022 | Toda et al. | |

FOREIGN PATENT DOCUMENTS

| | | |
|---|---|---|
| JP | 2008-149492 A | 7/2008 |
| JP | 2011-240531 A | 12/2011 |
| JP | 2013-186336 A | 9/2013 |
| JP | 2013-230567 A | 11/2013 |
| JP | 2015-102679 A | 6/2015 |
| JP | 2017-034033 A | 2/2017 |
| JP | 2017-129811 A | 7/2017 |
| JP | 2017207606 A | 11/2017 |
| JP | 2018-169562 A | 11/2018 |
| JP | 2020-042188 A | 3/2020 |
| JP | 2021-053812 A | 4/2021 |
| JP | 2021-057638 A | 4/2021 |
| WO | 2016/190425 A1 | 12/2016 |

* cited by examiner

IMAGE FORMING APPARATUS

CROSS-REFERENCE TO RELATED APPLICATIONS

This application is a continuation of U.S. patent application Ser. No. 17/083,060 filed on Oct. 28, 2020, which claims priority under 35 U.S.C. § 119 from Japanese Patent Application No. 2019-198964 filed on Oct. 31, 2019. The entire subject matter of each of which are incorporated herein by reference in their entirety.

BACKGROUND

Technical Field

The present disclosures relate to an image forming apparatus provided with a wireless communication board configured to realize wireless communication function.

Conventionally, there has been known an image forming apparatus having a function of a wireless communication such as a wireless LAN communication and configured to connect to a network. In such an image forming apparatus, generally, a wireless communication board is connected to a main board of the image forming apparatus. In such a configuration, in order to secure a good communication condition, it is preferable that the wireless communication board is arranged not to overlap the main board. For example, the wireless communication board is arranged to protrude from an outline of the main board. As an example of such a configuration, the wireless LAN communication board is arranged on a side surface of the image forming apparatus and at a position facing a side wall constituting a sheet loading part. Therefore, a good communication condition can be secured.

In the conventional configuration of the image forming apparatus, however, since the sheet loading part is arranged at an upper surface of the image forming apparatus and the entire upper surface is formed to extend substantially horizontally, it is difficult to secure a large loading capacity (hereinafter, referred to as a "discharge capacity") for the sheets discharged to the sheet loading part by a discharging roller, and it is necessary to enlarge an outer size of a housing in order to secure the sufficiently large discharge capacity.

According to aspects of the present disclosures, there is provided an image forming apparatus, comprising a housing, a discharge tray provided at an upper surface of the housing, a discharging roller pair configured to discharge a sheet, in a discharge direction, to the discharge tray, a main board arranged in the housing, and a wireless communication unit including a first wireless communication board, the first wireless communication board being connected to the main board, and at lease a part of the first wireless communication board being arranged at a higher position with respect to the main board. The housing has a first part being arranged at a downstream side with respect to a nip of the discharging roller pair in the discharging direction, an upper surface of a side wall of the first part being arranged at a lower position with respect to the nip, and a second part being arranged at an upstream side with respect to the first part in the discharging direction, the discharging roller pair being located in the second part, an upper surface of a side wall of the second part being arranged at a higher position with respect to the first part. The wireless communication unit is arranged at the second part, and at least a part of the wireless communication unit is arranged at a higher position with respect the side wall of the first part.

BRIEF DESCRIPTION OF THE ACCOMPANYING DRAWINGS

DETAILED DESCRIPTION OF THE EMBODIMENT

[Configuration of Image Forming Apparatus]

Figure 1:
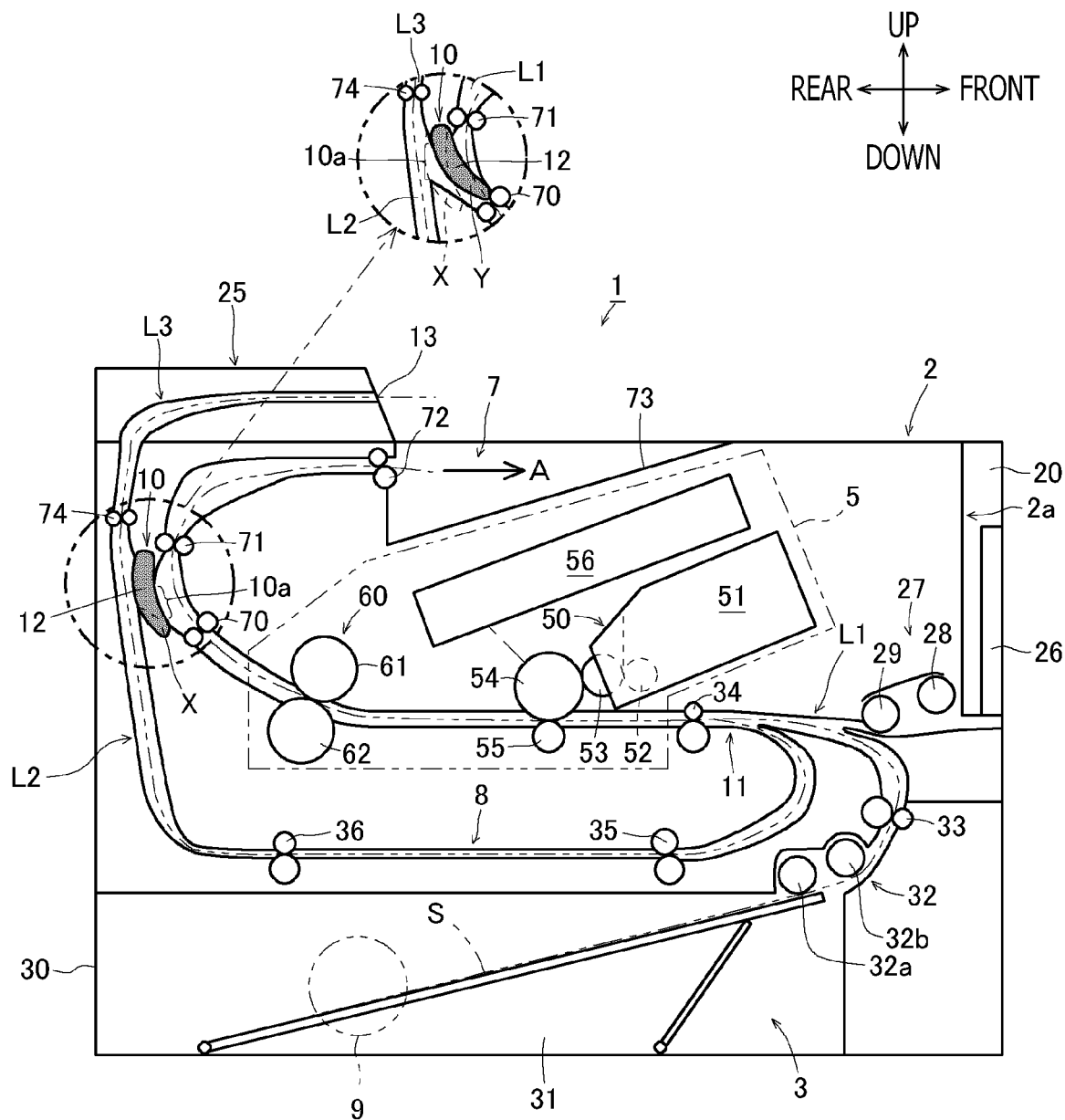
FIG. 1 is a cross-sectional side view of an image forming apparatus according to the present disclosures.

FIG. 1 shows an image forming apparatus 1 which is an illustrative embodiment of an image forming apparatus according to aspects of the present disclosures. The image forming apparatus 1 includes a housing 2, a sheet feeder 3, an image forming part 5, an discharge part 7, a re-conveying part 8 and a motor 9.

In the following description, a right-hand side and a left-hand side of FIG. 1 will be referred to as a front side and a rear side of the image forming apparatus 1, respectively. A near side and a far side in FIG. 1 will be referred to as a left side and a right side of the image forming apparatus 1, respectively. Further, an upside and a downside of FIG. 1 will be referred to as an upside and a downside of the image forming apparatus 1, respectively.

The housing 2 accommodates the sheet feeder 3, the image forming part 5, the discharge part 7, the re-conveying part 8 and the motor 9. As shown in FIGS. 2-5, the housing 2 includes a front cover 20, a rear cover 21, a left side cover 22, a right side cover 23, an upper cover 24 and an upper end cover 25.

The front cover 20 is swingably supported by the housing 2 and is configured to swing between a closed position where the front cover 20 closes an opening 2a formed on the front surface of the housing 2 and an open position where the front cover 20 opens the opening 2a.

As shown in FIG. 1, the sheet feeder 3 is arranged at a lower side of the housing 2 and configured to convey a sheet S supported by a sheet cassette 30 to the image forming part 5. The image forming part 5 is arranged at a downstream side with respect the sheet feeder 3 in a sheet conveying direction of the sheet S and is configured to form an image on the sheet S conveyed from the sheet feeder 3. The discharge part 7 is arranged at a downstream side with respect to the image forming part 5 in the sheet conveying direction and is configured to discharge the sheet S on which the image is formed by the image forming part 5 to an outside of the image forming apparatus 1.

The image forming apparatus 1 has a conveying path L1 for the sheet S that extends from the sheet feeder 3, through the image forming part 5, to the discharge part 7. The sheet feeder 3 includes a sheet cassette 30 that supports the sheets S, a sheet feeding mechanism 32, a conveying roller pair 33, and a registration roller pair 34 that conveys the sheet S along the conveying path L1.

The sheet feeding mechanism 32 includes a sheet feeding roller 32a and a separating roller 32b. The sheet feeding roller 32 is a roller configured to feed the sheets S supported by the sheet cassette 30 toward the separating rollers 32b. The separating roller 32b is arranged at a downstream side with respect to the sheet feeding roller 32a in the sheet conveying direction of the sheet S.

The sheets S fed by the sheet feeding roller 32a toward the separating roller 32b are separated one by one between the separating roller 32b and a conventionally known separating pad. Each separated sheet S is conveyed along the conveying path L1 toward the conveying roller pair 33.

The conveying roller pair 33 are rollers configured to provide a conveying force to the sheets S and are arranged at a downstream side of the sheet feeding mechanism 32 in the sheet conveying direction of the sheet S. The sheet S, which is conveyed from the sheet feeding mechanism 32 toward the conveying roller pair 33, is conveyed toward the registration roller pair 34 along the conveying path L1 by the conveying roller pair 33.

The registration roller pair 34 is arranged at the downstream side with respect to the conveying roller pair 33 in the sheet conveying direction. The registration roller pair 34 is configured to correct attitude of the sheet S by temporarily stopping movement of a leading edge of the conveyed sheet S. Then, the registration roller pair 34 conveys the sheet S to a transfer position of the image forming part 5 at a particular timing.

The image forming apparatus 1 includes an MP tray 26 configured to support a plurality of sheets S and a feeding mechanism 27 configured to feed the plurality of sheets S supported by the MP tray 26. The feeding mechanism 27 is configured to pick up the sheets S supported by the MP tray 26 one by one and convey the picked-up sheet S toward the registration roller pair 34. The feeding mechanism 27 includes a pickup roller 28 which is an example of a feeding roller and a separating roller 29.

The image forming part 5 is arranged inside the housing 2 and configured to form an image on the conveyed sheets S. The image forming part 5 includes a process cartridge 50 configured to transfer an image on the sheet S conveyed from the sheet feeder 3, an exposure unit 56 configured to expose a surface of the photosensitive drum 54 of the process cartridge 50, and a fixing part 60 configure to fix the image transferred on the sheet S by the process cartridge 50.

The process cartridge 50 is arranged at a higher position with respect to the sheet feeder 3 in the housing 2 and includes a developer chamber 51, a supplying roller 52, a developing roller 53, the photosensitive drum 54 and a transfer roller 55.

The exposure unit 56 has a well-known configuration and includes a laser diode, a polygon mirror, a lens, a mirror and the like, and is configured to expose a surface of the photosensitive drum 54 by emitting a laser beam toward the photosensitive drum 54 based on image data input to the image forming apparatus 1.

The developer chamber 51 accommodates toner serving as a developer according to the illustrative embodiment. The toner accommodated in the developer chamber 51 is conveyed to the supplying roller 52 while being agitated by an agitating member (not shown). The supplying roller 52 is configured to provide the toner conveyed from the developer chamber 51 to the developing roller 53.

The developing roller 53 is arranged to closely contact with the supplying roller 52, and holds the tonner supplied by the supplying roller 52 and charged by a conventionally known slide contacting member. A developing bias is applied to the developing roller 53 by a conventionally known bias applying unit.

The photosensitive drum 54 is arranged adjacent to the developing roller 53. The surface of the photosensitive drum 54 is uniformly charged by a charger (not shown) and exposed by the exposure unit 56. Electrical potential of an exposed portion of the photosensitive drum 54 is lower than the other parts, an electrostatic latent image based on the image date is form on the photosensitive drum 54. Then, the charged toner is supplied from the developing roller 53 to the surface of the photosensitive drum 54 on which the electrostatic latent image is formed, and thereby the electrostatic latent image is visualized and becomes a developer image.

The transfer roller 55 is arranged to oppose to the photosensitive drum 54, and a negative transfer bias is applied to the transfer roller 55 by a conventionally known bias applying unit. The developer image formed on the outer surface of the photosensitive drum 54 is transferred onto the surface of the sheet S by conveying the sheet S while nipping the sheet S between the photosensitive drum 54 onto which the developer image is formed and the transfer roller 55 (i.e., a transfer position) in a state where the transfer bias is applied on the outer surface of the transfer roller 55.

The fixing part 60 includes a heating roller 61 and a pressing roller 62. The heating roller 61 is driven to rotate by a driving force of the motor 9 and is heated by electricity supplied from a conventionally known power unit. The pressing roller 62 is arranged to oppose to the heating roller 61 and is in close contact with the heating roller 61 to be driven to rotate by the heating roller 61. As the sheet S onto which the developer image is transferred is conveyed along the conveying path L1 to the fixing part 60, the fixing part 60 conveys the sheet S while nipping the sheet S between the heating roller 61 and the pressing roller 62 to fix the developer image on the sheet S.

A first intermediate discharging roller pair 70 and a second intermediate discharging roller pair 71 arranged inside the housing 2 and on a downstream side with respect the image forming part 5 in the sheet conveying direction. Each of first and second intermediate discharging roller pairs 70 and 71 is configured to convey the sheet S, which is conveyed from the fixing part 60 along the conveying path L1, toward an discharging roller pair 72.

The discharge part 7 includes the discharging roller pair 72 and a discharge tray 73. The discharging roller pair 72 is configured to further convey the sheet S, which is conveyed from the intermediate discharging roller pairs 70 and 71, and discharge the sheet S outside the housing 2. The discharge tray 73 is provided at an upper surface of the upper cover 24 constituting the housing 2. In this embodiment, the discharge tray 73 is formed on the upper surface of the upper cover 24. The sheet S discharged outside the housing 2 by the discharging roller pair 72 is supported by the discharge tray 73. It is noted that each roller of the discharging roller pair 72 and the intermediate discharging roller pairs 70 and 71 is rotatably supported by a metal shaft (not shown) fixed to the housing 2 or a supporting frame 90 (see FIG. 8).

[Re-Conveying Path L2]

The image forming apparatus 1 includes a re-conveying path L2 formed below the image forming part 5. When the image forming apparatus 1 executes a both side printing, the sheet S is conveyed again toward the image forming part 5 along the re-conveying path L2. The re-conveying path L2 is a path used to convey the sheet S, on one side of which an image has been formed by the image forming part 5, to the image forming part 5 again.

The re-conveying path L2 diverges from the conveying path L1 at a diverging part 10 defined along the conveying path L1 between the first intermediate discharging roller pair 70 and the second intermediate discharging roller pair 71, and joins the conveying path L1 at a joining part 11 positioned along the conveying path L1 between the conveying roller pair 33 and the registration roller pair 34.

The sheet S conveyed to the re-conveying path L2 is further conveyed toward the image forming part 5 by a second re-conveying roller pair 36 and a first re-conveying roller pair 35 provided along the re-conveying path L2.

[Switch Back Path L3]

The image forming apparatus 1 includes a switch back path L3 formed behind the image forming part 5. The switch back path L3 is a path for switching the front and the rear of the sheet S before conveying the sheet S from the conveying path L1 to the re-conveying path L2. As shown in FIG. 1, the switch back path L3 is formed to the upper end cover 25 of the housing 2.

The switch back path L3 is formed in a U-shape, diverging from the conveying path L1 at the diverging part 10, extending upward in a direction opposite to the re-conveying path L2 and then making a U-turn to extend toward the front. The switch back path L3 is arranged upstream side with respect to the re-conveying path L2 in the sheet conveying direction of the sheet S. An end of the switch back path L3 opposite to an end connected to the re-conveying path L2 is an opening 13 that is open at a front side of the upper end cover 25. The switch back path L3 is configured such that a portion of the sheet S introduced to the switch back path L3 that does not fit into the switch back path L3 protrudes from the opening 13 to outside the housing 2.

The switch back path L3 is provided with a switch back roller pair 74. The switch back roller pair 74 is configured such that the rotating direction is switchable. That is, the switch back roller pair 74 is configured to be driven in a rotating direction for introducing the sheet S to the switch back path L3 (i.e., a normal rotating direction) and in a rotating direction for conveying the sheet S from the switch back path L3 toward the re-conveying path L2 (i.e., a reverse rotating direction). It is noted that each roller of the switch back roller pair 74 is rotatably supported by a metal shaft fixed to the housing 2 and the supporting frame 90 (see FIG. 8).

In the image forming apparatus 1, by the re-conveying part 8 including the re-conveying path L2 and the switch back path L3, it is possible to convey the sheet S, onto which an image has been formed on one side by the image forming part 5 arranged along the conveying path L1, toward the image forming part 5 again through the re-conveying path L2 and the switch back path L3 to form an image on the other side of the sheet S. That is, with the image forming apparatus 1, it is possible to execute a both side printing.

[Switch Back Mechanism]

As shown in FIG. 1, the image forming apparatus 1 is provided with a flapper 12 at the diverging part 10. The flapper 12 is a member for switching the conveying direction of the sheet S at the diverging part 10 between the conveying path L1 and the re-conveying path L2 and switch back path L3. The flapper 12 is provided to the housing 2 so as to be swingable with respect to the housing 2. When guiding the sheet S conveyed from the fixing part 60 toward the discharge tray 73, the flapper 12 is positioned at an discharge position X where the flapper 12 closes the opening 10a that leads to the re-conveying path L2. When guiding the sheet S conveyed from the fixing part 60 toward the re-conveying path L2 and the switch back path L3, the flapper 12 swings frontward from the discharge position X to a re-conveying position Y to open the opening 10a and close the conveying path L1 that leads to the discharge tray 73.

When the flapper 12 is at the re-conveying position Y, the sheet S conveyed from the conveying path L1 to the opening 10a is conveyed obliquely upward and rearward and is firstly introduced to the switch back path L3. The sheet S introduced to the switch back path L3 is passed to the switch back roller pair 74 and is conveyed toward the switch back path L3 until the entire length of the sheet S along the conveying direction passes through the opening 10a. After the entire length of the sheet S passed through the opening 10a, the rotating direction of the switch back roller pair 74 is reversed and the sheet S is conveyed from the switch back path L3 toward the re-conveying path L2. At this time, the flapper 12 is swung toward the discharge position X to close the opening 10a. Then, the sheet S is passed from the switch back roller pair 74 to the second re-conveying roller pair 36 and the first re-conveying roller pair 35, conveyed along the re-conveying path L2 and introduced to the conveying path L1 again at the joining part 11.

[Wireless Communication Unit]

As shown in FIGS. 2-5, the image forming apparatus 1 includes a wireless communication unit 80 arranged at a side surface 22a of the left side cover 22 and a main board 85 arranged at a back side (i.e., an inner side) of the left side cover 22.

The wireless communication unit 80 is an example of a wireless communication device and enables to input of information to the image forming apparatus 1 from an external terminal through wireless communication. The wireless communication unit 80 enables communication with an external terminal (e.g., a smart phone) and includes a first wireless communication board 81. The first wireless communication board 81 according to the present embodiment is a board realizing wireless communication through a wireless LAN and is connected to the main board 85. The wireless communication board 80 includes a board cover 82 configured to cover the first wireless communication board 81. The wireless communication unit 80 further includes an openable cover 83 configured to open/close an opening 22b formed on the side surface 22a of the left side cover 22. According to the present embodiment, the first wireless communication board 81 of the wireless communication unit 80 is the board for the wireless LAN. It is noted, however, the wireless communication board used as the first wireless communication board 81 may be a board realizing a wireless communication according to another communication standard such as a near field communication (NFC) or Bluetooth™

[Operation Panel Unit]

An operation panel unit 4 is provided to an upper surface 24a of the upper cover 24 consisting the housing 2. The user operates the operation panel unit 4 to input instructions/commands to the image forming apparatus 1, and the operation panel unit 4 is configured to display information indicating a state of the image forming apparatus 1. The operation panel unit 4 includes an operation panel 4a, which is configured as a touch panel, and a panel accommodating part 4b configured to accommodate the operation panel 4a. The panel accommodating part 4b is rotatably supported by the housing 2. A rotation angle of the operation panel 4a can be adjusted by rotating the panel accommodating part 4b to an appropriate angular position where the operation panel unit 4a is operable and visually recognizably easily.

A part of the operation panel unit 4 is protruded, in the width direction, from the side surface 22a of the left side cover 22, which constitutes the housing 2. With this configuration, a dimensions of the operation panel 4a is secured and operativity and visibility of the operation panel 4a are improved.

[Wireless Communication Unit]

On the upper surface 24a of the upper cover 24A, there is provided a wireless communication unit 6, which is configured to receive information to the image forming apparatus 1 from an external terminal by the wireless communication. The wireless communication unit 6 is configured to exchange data with an external terminal such as a smart phone. A second wireless communication board 6a is accommodated in the wireless communication unit 6. The second wireless communication board 6a according to the present embodiment is a board realizing a near-field wireless communication (NFC). When the external terminal having an NFC function is passed over the wireless communication unit 6. Data transmission/reception can be performed between the external terminal and the image forming apparatus 1 (i.e., the wireless communication unit 6) as the external terminal having the NFC function is held in front of the wireless communication unit 6.

[Arrangement of Wireless Communication Unit]

Figure 6:
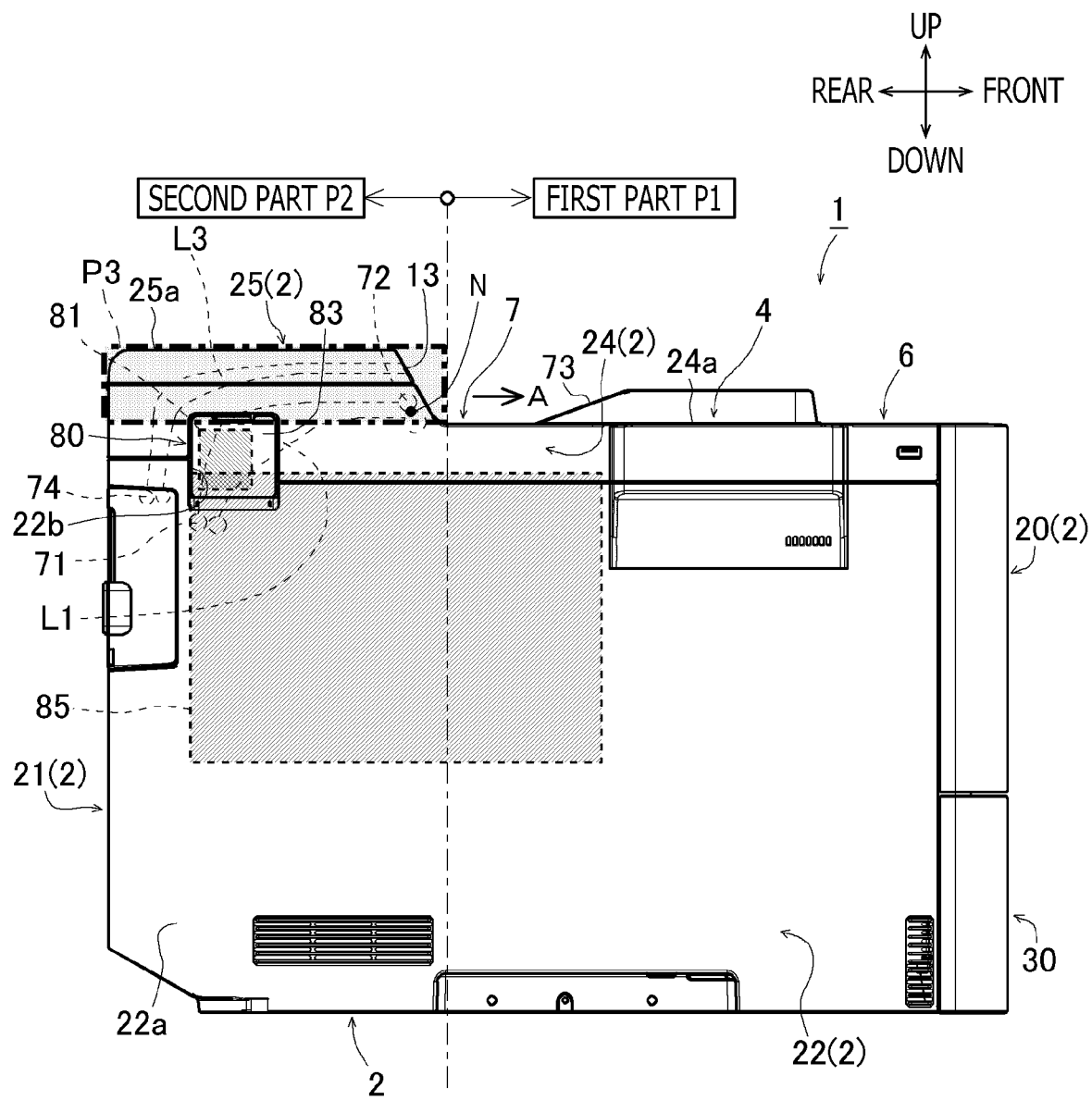
FIG. 6 is a left-side view of the image forming apparatus in which a first part and a second part of a housing are indicated.

As shown in FIG. 6, the image forming apparatus 1 includes the housing 2, the discharge tray 73 arranged at an upper surface of the housing 2, the discharging roller pair 72 configured to discharge the sheet S onto the discharge tray 73, the main board 85 arranged at a back side (i.e., an inner side) of a side wall of the housing 2 (in other words, the main board 85 arranged in the housing 2), and the wireless communication unit 80. The wireless communication unit 80 includes the first wireless communication board 81 which is connected to the main board 85 and is arranged at a higher position than the main board 85.

As shown in FIG. 6, the housing 2 is divided into a first part P1 and a second part P2. The first part P1 is arranged at a downstream side with respect to a nip N of the discharging roller pair 72 in a sheet discharge direction A with respect to the discharge tray 73, and an upper surface of a side wall of the first part P1 is arranged at a lower side with respect to the nip N. It is noted that "the upper surface of the side wall of the first part P1" is the upper surface 24a of the upper cover 24 in the first part P1.

In the second part P2, the discharging roller pair 72 is arranged. The second part 2 is arranged at an upstream side with respect to the first part A in the sheet discharge direction A Further, an upper surface of the second part 2 is arranged at a higher position than an upper surface of the first part P1. Specifically, an upper surface of a side wall of the second part 2 is arranged at a higher position than an upper surface of a side wall of the first part P1. It is noted that "the upper surface of the side wall of the second part P2" is an upper surface 25a of the upper end cover 25 in the second part P2.

As can be seen from FIG. 6, the second part P2 includes a third part P3 at a higher position with respect to the upper surface of the first part P1 (i.e., the upper surface of the side wall the first part P1), and at least a part of the wireless communication unit 80 is arranged at the third part P3. The third part P3 is included within a rectangle indicated by dashed-dotted lines in FIG. 6. When viewed from a side of the image forming apparatus 1, at least a part of the openable cover 83 of the wireless communication unit 80 is positioned within the third part P3. In the present embodiment, an example in which a part of the openable cover 83 of the wireless communication unit 80 is located within the third part P3 which is defined at a higher position with respect to the upper surface of the side wall of the first part P1. The configuration may be modified such that the part of the wireless communication unit 80 located within the third part P3 may be a part of the first wireless communication board 81.

Figure 7:
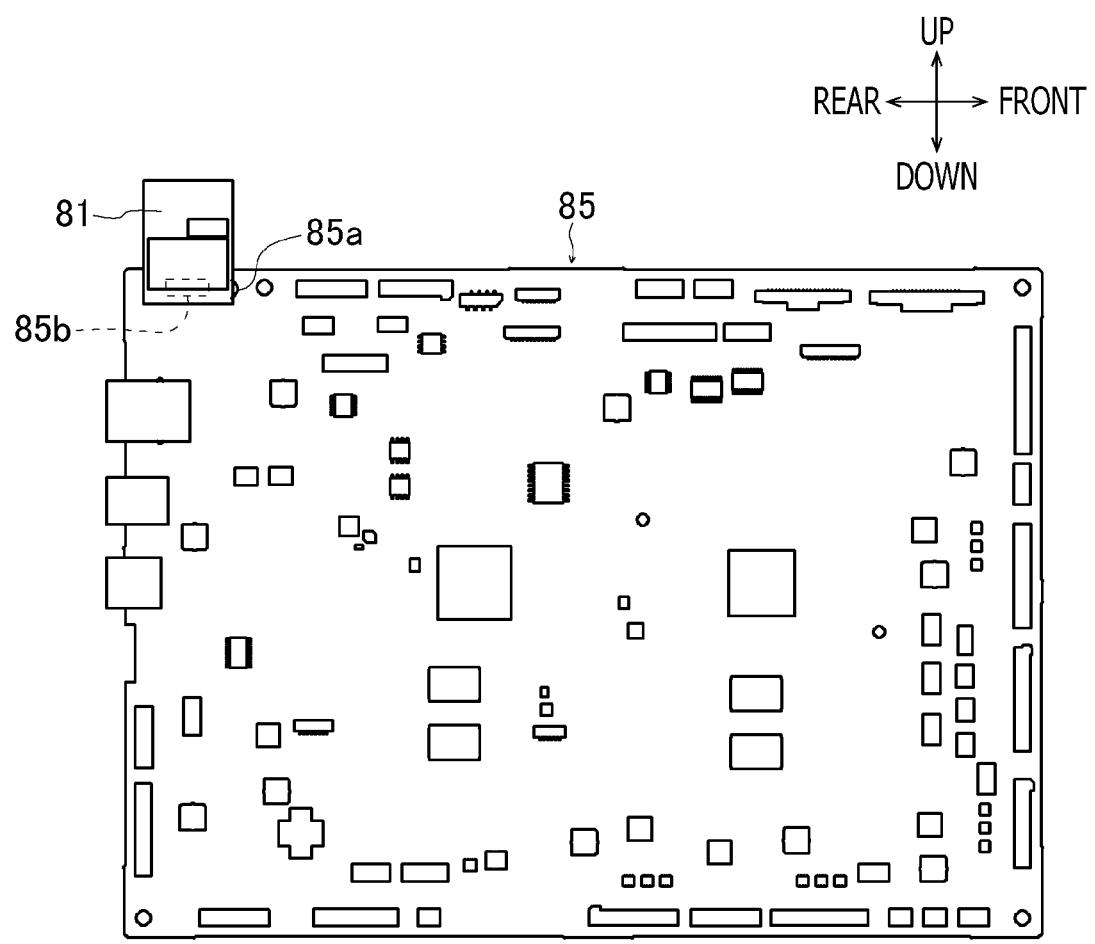
FIG. 7 is a side view showing an arrangement of a first wireless communication board with respect to a main board.
Figure 8:
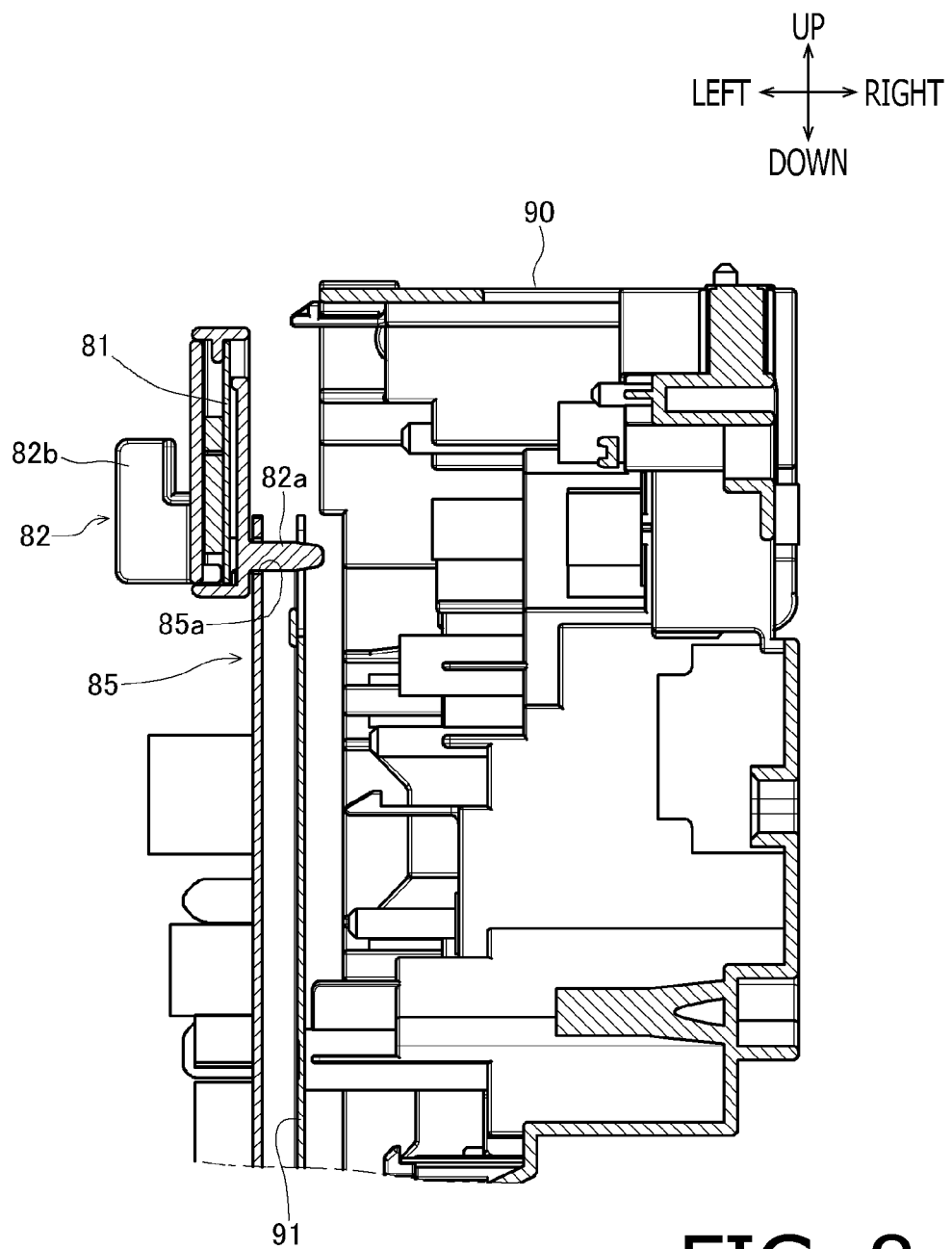
FIG. 8 is a cross-section front view showing a front part of the image forming apparatus showing an arrangement of a first wireless communication board with respect to a main board.

As shown in FIGS. 7 and 8, the first wireless communication board 81 is directly inserted into a connector 85b of the main board 85. According to this configuration, a harness for connecting the first wireless communication board 81 and the main board 85 is unnecessary, and therefore, it is unnecessary to secure a space in the housing 2 for arranging the harness therethrough. Accordingly, the wireless communication unit 80 can be made compact, and thus, the housing 2 can also be made compact. Therefore, the wireless communication unit 80 can be provided to the image forming apparatus 1 without affecting a product size of the image forming apparatus 1.

Configured as above, by providing the discharge tray 73 at the upper surface 24a of the first part P1, quantity of the sheets S accommodatable by the discharge tray 73 can be enhanced and it becomes easy for the user to withdraw the sheets S from the discharge tray 73. Further, according to the image forming apparatus 1, by providing the wireless communication unit 80 in the second part P2 including the third part P3 which is located at a higher position with respect to the first part P1, it is possible to arrange the wireless communication unit 80 without affecting a product size of the image forming apparatus 1.

[Arrangement of First Wireless Communication Board]

As shown in FIG. 6, in the image forming apparatus 1, at least a part of the first wireless communication board 81 overlaps, when viewed from a side, the conveying path L1 which is a discharge path space used to guide the sheet S toward the discharging roller pair 72. With this configuration, a radio wave transmitted from the first wireless communication board 81 and a radio wave to be received by the first wireless communication board 81 easily propagate through the discharge path space, and intensity of the radio wave for a wireless communication by the first wireless communication board 81 can be secured easily. In the image forming apparatus 1 according to the present embodiment shown in FIG. 6, a part of the first wireless communication board 81 overlaps the conveying path L1 when viewed from the side. It is noted that a part of the first wireless communication board 81 does not necessarily overlap the conveying path L1 in the image forming apparatus 1.

The first wireless communication board 81 is arranged, in the side view, at a position not overlapping the discharging roller pair 72. Further, the first wireless communication board 81 is arranged, in the side view, at a position not overlapping the second intermediate discharging roller pair 71 or the switchback roller pair 74. According to such a configuration, the radio wave output by the first wireless communication board 81 and/or the radio wave to be received by the first wireless communication board 81 are suppressed from being blocked by the metal shafts supporting the rollers of the discharging roller pair 72 or the switchback roller pair 74. Accordingly, the intensity of the radio wave for the wireless communication by the first wireless communication board 81 can easily be secured.

As shown in FIG. 7, the first wireless communication board 81 is arranged such that a portion of the first wireless communication board 81 other than the portion directly inserted in the connector 85b of the main board 85 is arranged, in the side view, to be located outside the main board 85. Further, as shown in FIG. 6, at least a part of the first wireless communication board 81 is located at the higher position with respect to the main board 85. According to such a configuration, the radio wave output by the first wireless communication board 81 and/or the radio wave to be received by the first wireless communication board 81 are suppressed from being blocked by the main board 85. Accordingly, the intensity of the radio wave for the wireless communication by the first wireless communication board 81 can easily be secured.

Further, as shown in FIG. 8, the main board 85 is attached to a metallic supporting plate 91, which is fixed to the supporting frame 90 arranged inside the housing 2. As shown in FIGS. 7 and 8, the first wireless communication board 81 is arranged such that the portion of the first wireless communication board 81 other than the portion inserted to the connector 85b of the main board 85 is arranged, in the side view, to be located at a position higher than the metallic supporting plate 91, and an overlapping area, in the side view, between the first wireless communication board 81 and the supporting plate 91 is relatively small. According to such a configuration, the radio wave output by the first wireless communication board 81 and/or the radio wave to be received by the first wireless communication board 81 are suppressed from being blocked by the metallic supporting plate 81. Accordingly, the intensity of the radio wave for the wireless communication by the first wireless communication board 81 can easily be secured.

[Arrangement of Main Board]

As shown in FIG. 6, in the image forming apparatus 1, the main board 85 is arranged across the first part P1 and the second part P2. In the image forming apparatus 1, a shape defined by the first wireless communication board 81 and the main board 85, and a shape of the housing 2 are similar to each other, and each has an upwardly protruding portion in a rear part. By arranging the main board 85 and the first wireless communication board 81 such that the shape defined thereby corresponds to the shape of the housing 2, an internal space of the housing 2 can be used effectively, and the product size is not affected by the above configuration.

[Arrangement of Second Wireless Communication Board and Operation Panel Unit]

Figure 2:
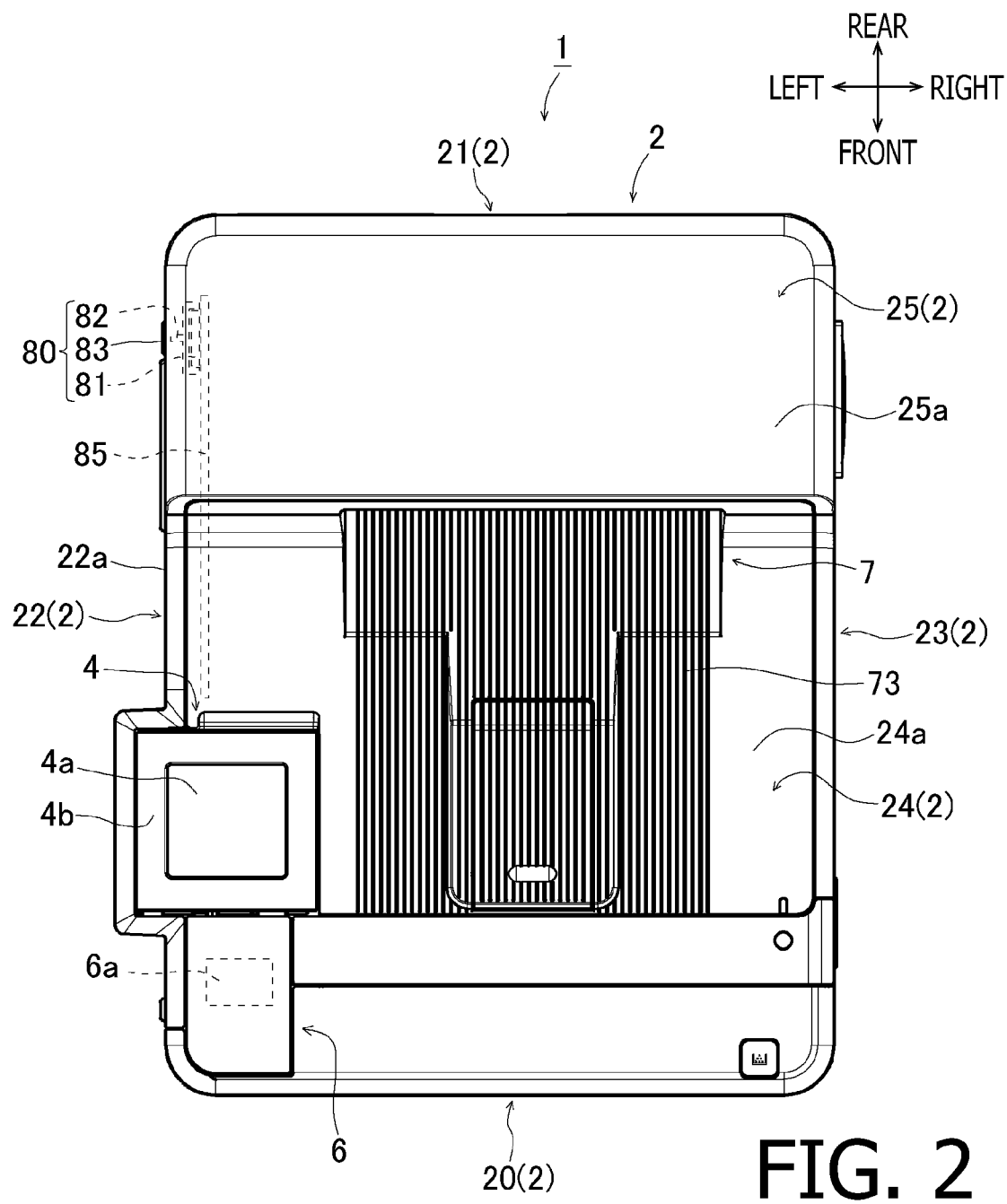
FIG. 2 is a plane view of the image forming apparatus.
Figure 3:
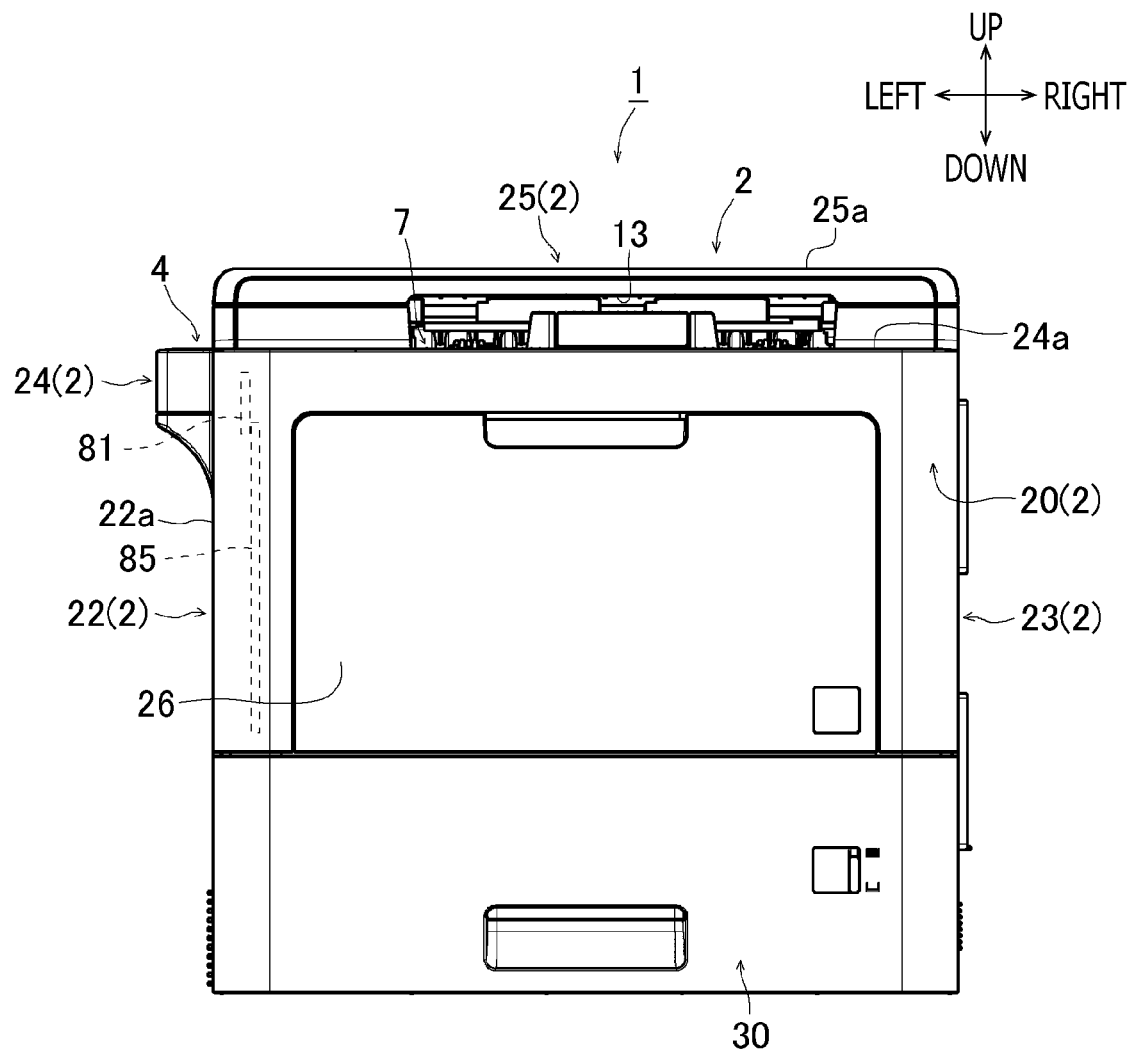
FIG. 3 is a front view of the image forming apparatus.
Figure 4:
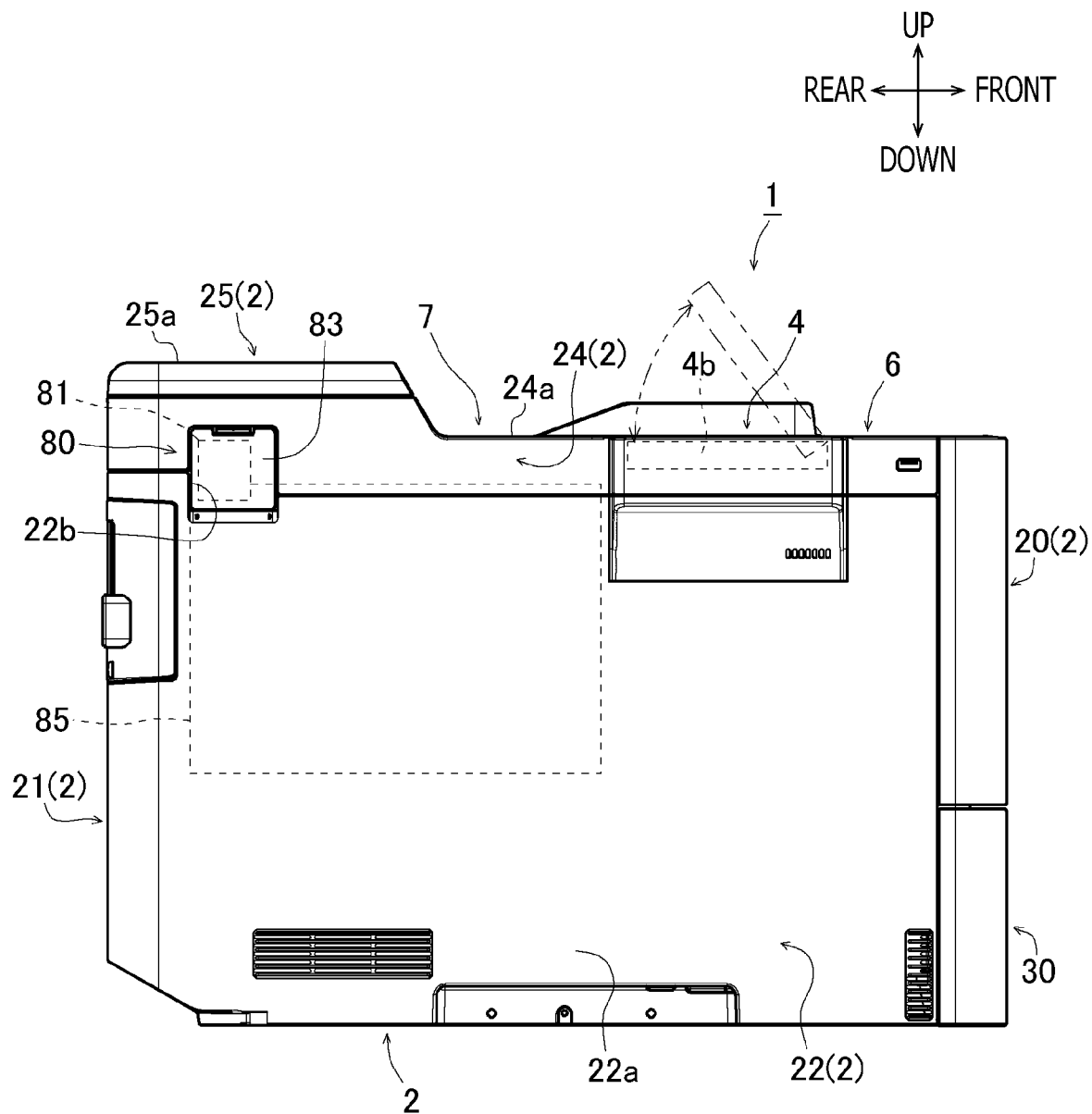
FIG. 4 is a left-side view of the image forming apparatus.
Figure 5:
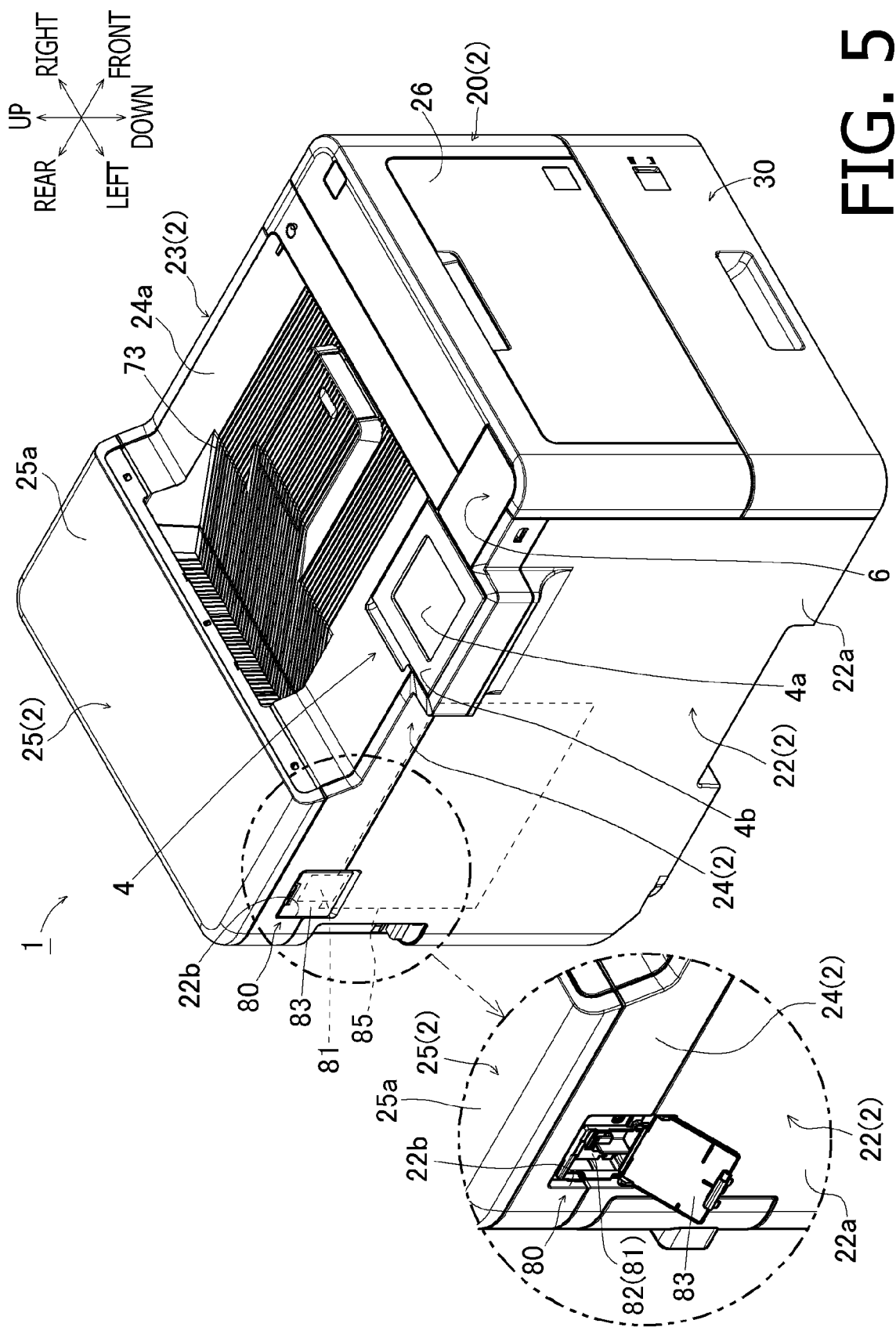
FIG. 5 is a perspective view of the image forming apparatus.

As shown in FIG. 2, the wireless communication unit 6 includes the second wireless communication board 6a which is provided separately from the first wireless communication board 81. Further, in the image forming apparatus 1, the operation panel unit 4 is arranged between the first wireless communication board 81 and the second wiles communication board 6a.

Configured as above, the operation panel unit 4, which includes metal elements therein, can be functioned as a shield member of a radio wave. Therefore, it is possible to suppress interference between the wireless communication by the first wireless communication board 81 (i.e., the wireless LAN in the present embodiment) and the wireless communication by the second wireless communication board 6a (i.e., the NFC in the present embodiment).

[Shape of Operation Panel Unit]

As shown in FIG. 2, in the image forming apparatus 1, at least a part of the operation panel unit 4 is arranged to protrude outwardly, in a width direction perpendicular to the sheet discharge direction A, from the side surface 22a of the left side cover 22 serving as a left side wall. According to the image forming apparatus 1, a part of the operation panel unit 4, which is protruded in the width direction, functions as a physical shield configured to block the radio wave transmitted between the first wireless communication board 81 and the second wireless communication board 6a.

According to the image forming apparatus 1 having such a configuration, it is possible to block the radio wave with the part of the operation panel unit protruded in the width direction, and it is ensured that interference between the wireless communication using the first wireless communication board 81 (e.g., wireless LAN) and the wireless communication using the second wireless communication board 6a (e.g., NFC) is ensured.

[Board Cover]

Figure 9:
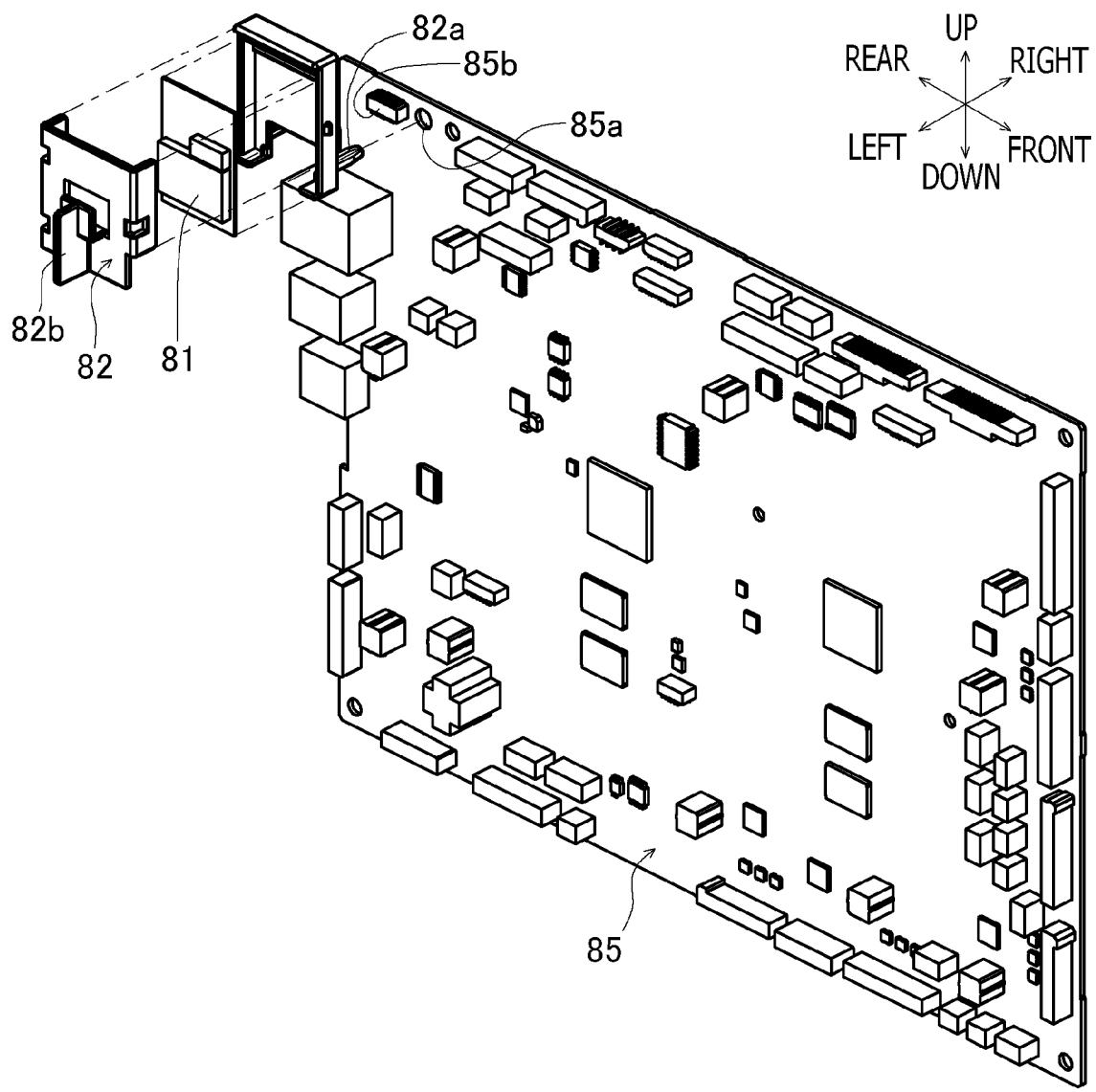
FIG. 9 is a perspective view showing a connecting state of a first wireless communication board with respect to a main board.

As shown in FIGS. 8 and 9, the image forming apparatus 1 is configured such that a board cover 82 is attached to the first wireless communication board 81. On the board cover 82, a protruded part 82a used for positioning and a knob 82b which serves as a user grip. When the first wireless communication board 81 is attached to the main board 85, the first wireless communication board 81 to which the board cover 82 is attached is inserted in the housing 2 through the opening 22b with the openable cover 83 being opened (see FIG. 5). Then, by inserting the protruded part 82a into a positioning hole 85 of the main board 85 for positioning, and positioned, and by pushing the entire protruded part 82a to the depth side, the first wireless communication board 81 is attached to the main board 85.

When an operation to attach the first wireless communication board 81 to the main board 85, the user can insert the first wireless communication board 81 into the opening 22b with holding the knob 82b formed on the board cover 82. Therefore, the user can easily position the first wireless communication board 81 with respect to the main board 85 which is located at a deep position and can easily insert the same. Further, in the image forming apparatus 1, since the board cover 81 provided with the protruded part 82a and the knob 82b is attached to the first wireless communication board 81, the first wireless communication board 81 can be attached to the main board 85 through the relatively small opening 22b. Accordingly, the opening 22b and the openable cover 83 can be made small.

In the image forming apparatus 1 according to the present embodiment, the wireless communication unit 80 includes the board cover 82 covering the first wireless communication board 81. However, such a configuration may be modified such that the board cover 82 is not provided. Further, the image forming apparatus 1 according to the present embodiment is configured such that the openable cover 83 for the wireless communication unit 80 is provided so that the first wireless communication board 81 can easily be attached to and detached from the main board 80. However, such a configuration may be modified such that the image forming apparatus 1 is not provided with the openable cover 83. In such a case, the first wireless communication board 81 cannot be detached externally from the main board 85.

What is claimed is:

1. An image forming apparatus, comprising:
   a discharge tray;
   a housing having an upper surface at which the discharge tray is provided, the housing including:

a top cover arranged at a higher position with respect to the discharge tray;

a first side cover arranged at one end part of the housing; and a second side cover arranged at another end part of the housing;

a discharging roller pair configured to discharge a sheet, in a discharge direction that is directed from the second side cover toward the first side cover, to the discharge tray, a nip point of the discharging roller pair being arranged at a higher position with respect to a lowest end of the discharge tray;

a main board arranged in the housing; and a first wireless communication board being connected to the main board, the first wireless communication board being arranged between the second side cover and the discharging roller pair in the discharge direction, the first wireless communication board being arranged under the top cover and between the lowest end of the discharge tray and the nip point of the discharging roller pair in an upper-lower direction, at least a part of the first wireless communication board being arranged at a higher position with respect to the main board.

2. The image forming apparatus according to claim 1, wherein, when viewed from a side of the image forming apparatus, the at least a part of the first wireless communication board overlaps a discharge path space guiding the sheet to the discharging roller pair.

3. The image forming apparatus according to claim 1, wherein the first wireless communication board is arranged at a position which does not overlap the discharging roller pair when viewed from the side of the image forming apparatus.

4. The image forming apparatus according to claim 1, wherein the main board is arranged under the top cover and the discharge tray.

5. The image forming apparatus according to claim 1, wherein a switchback path used to switch front and rear of the sheet is formed under the top cover, at least a part of the switchback path being arranged at a higher position with respect to the discharging roller pair.

6. The image forming apparatus according to claim 1, wherein the first wireless communication board is directly connected to the main board.

7. The image forming apparatus according to claim 1, further comprising:

a second wireless communication board provided separately from the first wireless communication board; and an operation panel unit arranged between the first wireless communication board and the second wireless communication board.

8. The image forming apparatus according to claim 6, wherein at least a part of the operation panel unit protrudes, in a width direction perpendicular to the discharge direction, from a side wall of the housing.

9. The image forming apparatus according to claim 1, wherein the top cover is arranged at a nearer position to the second side cover with respect to the discharge tray in the discharge direction.

10. The image forming apparatus according to claim 1, wherein the housing has a side wall, the side wall having an openable cover configured to open and close an opening formed on the side wall, and wherein the first wireless communication board is configured to be attached to and detached from the main board through the opening when the openable cover is open.

11. The image forming apparatus according to claim 1, wherein the top cover being arranged at a nearer position to the second side cover with respect to the discharge tray in the discharge direction, and wherein the first wireless communication board is a board for a wireless LAN communication.

\* \* \* \* \*